Patented Jan. 27, 1948

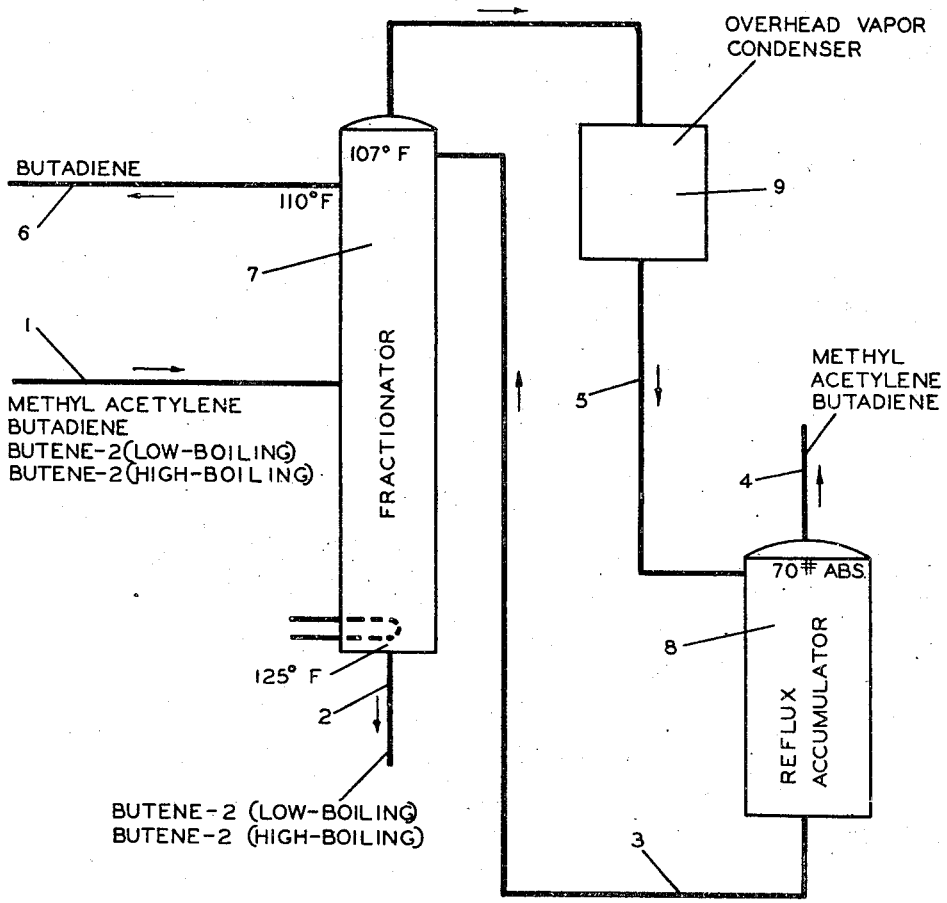

2,434,923

UNITED STATES PATENT OFFICE 2,434,923

DISTILLATION OF BUTADIENE FROM METHYL ACETYLENE AND HIGHER-BOILING HYDROCARBONS

Karl H. Hachmuth, Bartlesville, Okla., assignor to Phillips Petroleum Company, a corporation of Delaware Application March 22, 1943, Serial No. 480,084

7 Claims. (Cl. 202—40)

This invention relates to butadiene manufacture and more particularly to a method for separating methyl acetylene from butadiene. Still more particularly it relates to a method of separating methyl acetylene from butadiene in the same fractionator wherein butadiene is separated from less volatile hydrocarbons.

Rubber synthesis requires a butadiene product not only as pure as possible but also as free as possible of traces of material deleterious to the synthesis operations or to the quality of the rubber produced. In certain processes for the manufacture of butadiene, especially those involving the catalytic dehydrogenation of normal butenes, small quantities of methyl acetylene appear in the products of reaction. The quantities present are ordinarily of such low magnitude as to be termed "trace impurities." However, the volatility of the methyl acetylene is such that it may increase to an undesirable concentration in the feed charged to the fractionator in which butadiene is separated from less volatile hydrocarbons.

Conventional butadiene purification schemes provide for methyl acetylene removal in conjunction with the removal of other light impurities, namely $C_3$ and lighter such as propane, etc., by vapor recovery and/or depropanizing steps. However, the removal of methyl acetylene effected in these light gas separations is frequently not sufficiently complete to allow production of a final butadiene product which will meet the specifications with respect to content of methyl acetylene. In such case, conventional practice would require the addition of a separate fractionator to separate butadiene from methyl acetylene, whereas the process of my invention accomplishes this separation without the use of any additional fractionating equipment.

The principal object of my invention is to provide an improved process for separating methyl acetylene from butadiene. Another object is to make possible a separation between methyl acetylene and butadiene while separating butadiene from less volatile hydrocarbons, especially butene-2, thus effecting the production of high quality butadiene without requiring resort to further processing for methyl acetylene removal. Numerous other objects will hereinafter appear.

The accompanying drawing portrays diagrammatically one arrangement of equipment which may be used in carrying out the present invention.

I have discovered that a separation between methyl acetylene and butadiene may be effected in the same fractionator that is used for separating butadiene from less volatile hydrocarbons. This separation is accomplished by withdrawing liquid butadiene product from the fractionator at a point intermediate to the feed and reflux entries. Methyl acetylene is removed, along with some butadiene, as a vapor product from the reflux accumulator. For a given feed composition, the exact butadiene draw-off location will be determined by the reflux ratio, butadiene product purity desired, and the allowable methyl acetylene concentration in the butadiene product.

The butadiene product of my invention meets the butadiene specifications with respect to both butadiene percentage and freedom from methyl acetylene while a comparative butadiene product made by the conventional method with the same feed composition, the same fractionator, the same reflux ratio, and all other conditions the same with the sole exception that the butadiene product is withdrawn as liquid at the reflux accumulator, completely fails to meet the specification on methyl acetylene content. Thus the butadiene product of my invention easily meets the present-day specifications of at least 99% purity and of not more than 0.05% methyl acetylene.

For reference purposes, below are listed normal boiling points and vaporization equilibrium constants for the components apt to be encountered in the feed to which the process of my invention is applicable. These are the components involved in the specific example given later in this specification. It will be understood however that, while in the particular feeds referred to herein, butene-2 (both high and low boiling) is the component of the feed other than butadiene which is less volatile than butadiene, other less volatile hydrocarbons, such as four carbon atom acetylenes or hydrocarbons of five or more carbon atoms, may be present in the feed. Therefore while butene-2 has been selected as an example of a hydrocarbon less volatile than butadiene for purposes of illustrating my invention and while for a number of reasons butene-2 will be the hydrocarbon most frequently encountered in admixture with butadiene in the feed to the final fractionator, my invention is not limited thereto but is equally applicable in the presence of other less volatile hydrocarbons such as four carbon atom acetylenes, or hydrocarbons having more than four carbon atoms.

| Component | Normal Boiling Point, °F. | Vaporization Equilibrium constant, "K,"[1] at 120° F. and 70 lbs. per Sq. in. ABS. |
|---|---|---|
| Methyl Acetylene | −9.6 | 3.12 |
| Butadiene | +23.9 | 1.141 |
| Butene-2 (Low boiling) | 33.6 | .963 |
| Butene-2 (High boiling) | 38.5 | .897 |

[1] Equilibrium constant "K" is defined as the molal concentration in the vapor phase divided by the molal concentration in the liquid phase. The temperature and pressure given represent about average conditions in a butadiene fractionator.

In accordance with my invention the butadiene-containing feed also containing methyl acetylene and at least one hydrocarbon less volatile than butadiene, almost invariably butene-2, is fed to the final fractionator commonly employed to separate pure butadiene. The bottoms product comprising essentially all of the components of the feed less volatile than butadiene together with some butadiene is withdrawn as in the common practice. An overhead vapor comprising butadiene and methyl acetylene is withdrawn and subjected to at least partial condensation to provide reflux which is fed to the top of the column. From the reflux accumulator there is bled off a vaporous fraction which is enriched with respect to methyl acetylene, being much higher in methyl acetylene concentration than either the overhead vapor or the reflux. This vapor bleed stream may conveniently be recycled to a point in the butadiene recovery system ahead of the butadiene extraction unit, usually the light gas removal section of the plant whereby the butadiene content thereof is not lost.

The product butadiene substantially lower in methyl acetylene concentration than the overhead vapor and than the overhead would be when using the conventional final butadiene fractionation, is withdrawn as a liquid from the fractionator at a point located between the points at which the feed and the reflux enter the column and substantially below the point of reflux entry. This product meets the specifications both with regard to butadiene concentration and concentration of methyl acetylene.

Referring to the accompanying drawing, liquid feed enters the fractionator 7 via line 1. Fractionator 7 is conveniently a 120-tray column equipped with the usual trays and reboiling arrangement and with the overhead vapor condenser 9 and reflux accumulator 8. The liquid bottoms leaving via line 2 consists essentially of a small amount of butadiene, most of the butene-2 low boiling which was in the feed and all of the butene-2 high boiling which was present in the feed. The overhead vapors pass via line 5 and condenser 9, wherein practically all of the vapors is condensed, to reflux accumulator 8 whence the condensate portion is returned via line 3 to the top of column 7 as reflux, entering on the top tray. A vapor bleed stream consisting of methyl acetylene and butadiene is withdrawn via line 4 for recycle to the light gas removal portion (not shown) of the plant. The liquid butadiene product, which meets the specifications of at least 99 per cent butadiene and not over .05 per cent of methyl acetylene, is withdrawn from the fractionator 7 via line 6 located at a point below the top of the column 7, conveniently at tray No. 112 in a 120 tray column.

Following is a specific example illustrating the process of the present invention and giving comparative results obtained when using the same feed in the same fractionating column but removing the product butadiene in the conventional manner as liquid from the reflux accumulator.

*Example*

The specifications require a butadiene of at least 99 per cent purity with methyl acetylene not to exceed .05 per cent by weight.

The feed had the following composition

*Feed*

| Component | Mol Per Cent |
|---|---|
| Methyl Acetylene | 0.10 |
| Butadiene | 65.10 |
| Butene-2 (low boiling) | 16.20 |
| Butene-2 (high boiling) | 18.60 |
| | 100.00 |

The fractionator was an ordinary column of the usual type and had 120 trays. The external reflux ratio was 10 to 1. The kettle temperature was 125° F. The temperature at the top of the column (temperature of vaporous overhead leaving the column) was 107° F. The fractionator was operated at 70 lbs. per sq. in. absolute. The feed entered at tray No. 60 from the bottom of the column.

A. CONVENTIONAL PRACTICE, REMOVING BUTADIENE PRODUCT AS OVERHEAD

The liquid butadiene product was withdrawn from the reflux accumulator. It had the following composition. Since methyl acetylene is more volatile than butadiene, all methyl acetylene contained in the feed passes overhead.

*Overhead product*

| Component | Mol Per Cent |
|---|---|
| Methyl Acetylene | 0.16 |
| Butadiene | 99.40 |
| Butene-2 (low boiling) | 0.44 |
| Butene-2 (high boiling) | 0.00 |

From the foregoing it will be seen that while conventional operation permits separation of butadiene of sufficient purity, insofar as concentration of butadiene is concerned, yet the methyl acetylene content of the product exceeds the amount permitted by the specifications and therefore the butadiene product must be subjected to a further refinement step which is very inconvenient and expensive.

B. PRACTICE OF THE INVENTION, REMOVING BUTADIENE PRODUCT AS LIQUID STREAM BELOW POINT OF REFLUX ENTRY

All other conditions were the same as in A except that the butadiene product was taken off as a sidestream at tray No. 112. The methyl acetylene was removed from the fractionator at the point of its highest concentration, i. e. as a vapor product from the reflux accumulator while the butadiene product was removed at a point several trays from the top of the tower where the methyl acetylene is in low concentration. The operation was as shown on the drawing. The following stream compositions were obtained. The numbers of the streams correspond to the numbers of the lines on the drawing.

| Stream | Description | Mol Per Cent Composition | | | |
|---|---|---|---|---|---|
| | | Methyl Acetylene | Butadiene | Butene-2 (low boiling) | Butene-2 (high boiling) |
| 1 | Feed to Fractionator | 0.10 | 65.10 | 16.20 | 18.60 |
| 2 | Bottoms product | | 1.70 | 45.30 | 53.00 |
| 3 | Reflux | 7.57 | 92.43 | trace | |
| 4 | Vapor bleed | 19.30 | 80.70 | trace | |
| 5 | Overhead vapor | 7.58 | 92.42 | trace | |
| 6 | Butadiene Product | 0.04 | 99.38 | 0.58 | |

Thus it will be seen that by changing operation from the conventional practice to conform to the present invention, the methyl acetylene specification is easily met while the butadiene concentration of the product is not substantially reduced.

From the above disclosure it will be seen that the present invention enables the production of butadiene sufficiently low in methyl acetylene to meet the specifications without requiring any additional units of equipment and in a very simple manner. Thus the process of the invention effectively solves the problem which frequently confronts butadiene manufacturers who employ conventional final fractionation of butadiene in the presence of methyl acetylene, especially fractionation of butadiene from butenes-2 in the presence of this acetylene. A great many other advantages of the process of my invention will be at once apparent to skilled workers in the art.

It is to be understood that my invention is by no means restricted to the conditions given in the specific example for illustrative purposes only, but is applicable under widely varying conditions. The broad idea underlying the above description is to be considered as the main inventive contribution. Hence I am not limited to the withdrawal of the butadiene product at the particular tray referred to or to any other specific condition and the invention is to be taken as limited only as set forth expressly or by fair implication in the appended claims.

I claim:

1. The process of separating butadiene from a hydrocarbon mixture containing the same and also containing methyl acetylene and at least one hydrocarbon less volatile than butadiene which comprises passing said mixture to a fractionator, withdrawing from said fractionator a bottom product comprising said less volatile hydrocarbon and an overhead vapor comprising butadiene and methyl acetylene, condensing said overhead vapor, withdrawing from the condensate a vaporous fraction containing methyl acetylene in considerably higher concentration than either the overhead vapor or the residual liquid condensate, returning the entire said residual liquid condensate to the top of said fractionator as reflux therefor, said reflux consisting essentially of butadiene and methyl acetylene, and withdrawing liquid butadiene product at a point in the fractionator intermediate the points at which the feed and reflux enter the same, said butadiene product being substantially lower in methyl acetylene concentration than said overhead vapor.

2. The process of separating butadiene from a hydrocarbon mixture containing the same and also containing methyl acetylene and butene-2 which comprises passing said mixture to a fractionator, withdrawing from said fractionator a bottom product comprising said butene-2 and an overhead vapor comprising butadiene and methyl acetylene, condensing said overhead vapor, withdrawing from the condensate a vaporous fraction containing methyl acetylene in considerably higher concentration than either the overhead vapor or the residual liquid condensate, returning the entire said residual liquid condensate to the top of said fractionator as reflux therefor, said reflux consisting essentially of butadiene and methyl acetylene, and withdrawing liquid butadiene product at a point in the fractionator intermediate the points at which the feed and reflux enter the same, said butadiene product being substantially lower in methyl acetylene concentration than said overhead vapor.

3. The process of separating butadiene from a hydrocarbon mixture containing the same and also containing methyl acetylene and butene-2 which comprises passing said mixture to a tray-type fractionator, withdrawing from said fractionator a bottom product comprising said butene-2 and an overhead vapor comprising butadiene and methyl acetylene, cooling said overhead vapor to effect condensation of the major portion thereof, bleeding off the uncondensed portion of said overhead vapor, said bled off uncondensed portion being much higher in methyl acetylene concentration than either the overhead vapor or the condensate and containing methyl acetylene in amount substantially equal to the methyl acetylene content of the feed, returning the condensate to the top of said fractionator as reflux therefor, said reflux consisting essentially of butadiene and methyl acetylene, and withdrawing liquid butadiene product at a point in the fractionator intermediate the points at which the feed and reflux enter the same, said point of product withdrawal being several trays below the top of the column at which the methyl acetylene is in low concentration, said butadiene product containing not over 0.05% by weight of methyl acetylene.

4. The process of recovering butadiene containing at least 99 per cent by weight of butadiene and not more than 0.05 per cent by weight of methyl acetylene from a hydrocarbon feed consisting essentially of butadiene, butene-2 and methyl acetylene in amount such that were said mixture fractionally distilled in the conventional manner to separate butadiene from butene-2 the butadiene product obtained as an overhead would contain substantially more than 0.05 per cent by weight of methyl acetylene, in the same fractionator wherein butadiene is separated from butene-2, which comprises introducing said feed into a fractionator at an intermediate point therein and fractionally distilling same therein, withdrawing from the fractionator a vaporous overhead product consisting essentially of butadiene and substantially all of the methyl acetylene contained in said feed, partially condensing said overhead to form a liquid condensate and a vaporous fraction which is much higher in methyl acetylene concentration than either the overhead vapor or said condensate, withdrawing from the system said vaporous fraction, returning the entire liquid condensate to the top of said fractionator as reflux therefor, and withdrawing a liquid butadiene product containing at least 99 per cent by weight of butadiene and not more than 0.05 per cent by weight of methyl acetylene from said fractionator at a point therein located intermediate the points of feed entry and reflux entry and substantially below the latter.

5. The process of claim 4 wherein said fractionator is a 120-tray column, the feed enters at the 60th tray, the liquid butadiene product is withdrawn at the 112th tray and the column is operated at a pressure of approximately 70 pounds absolute, with a bottom temperature of approximately 125° F. and a top temperature of approximately 107° F.

6. The process of recovering butadiene substantially free from methyl acetylene from a hydrocarbon feed containing butadiene, methyl acetylene, and at least one hydrocarbon less volatile than butadiene, in the same fractionator wherein butadiene is separated from said hydrocarbon less volatile than butadiene, which comprises introducing said feed into a fractionator at an intermediate point therein and fractionally distilling same therein, withdrawing from said fractionator a bottom product comprising said less volatile hydrocarbon and an overhead vapor comprising butadiene and substantially all of the methyl acetylene contained in said feed, condensing said overhead vapor, returning at least a portion of the condensate to the top of said fractionator as reflux therefor, said reflux consisting essentially of butadiene and methyl acetylene, and withdrawing liquid butadiene product at a point in the fractionator intermediate the points at which the feed and reflux enter the same, said butadiene product being substantially free from methyl acetylene.

7. The process of recovering butadiene substantially free from methyl acetylene from a hydrocarbon feed containing butadiene, methyl acetylene, and butene-2, in the same fractionator wherein said butadiene is separated from said butene-2, which comprises introducing said feed into a fractionator at an intermediate point therein and fractionally distilling same therein, withdrawing from the fractionator a bottoms product of butene-2 and an overhead vapor consisting essentially of butadiene and substantially all of the methyl acetylene contained in said feed, condensing said overhead and returning at least a portion of the condensate to the top of said fractionator as reflux therefor, said reflux consisting essentially of butadiene and methyl acetylene, and withdrawing a liquid butadiene product substantially free from methyl acetylene at a point in the fractionator intermediate the points at which the feed and reflux enter the same.

KARL H. HACHMUTH.

REFERENCES CITED

The following references are of record in the file of this patent:

UNITED STATES PATENTS

| Number | Name | Date |
|---|---|---|
| 1,937,786 | Ricard et al. | Dec. 5, 1933 |
| 2,148,846 | Von Retze et al. | Feb. 28, 1939 |
| 2,172,560 | Kemp et al. | Sept. 12, 1939 |

FOREIGN PATENTS

| Number | Country | Date |
|---|---|---|
| 386,052 | Great Britain | Jan. 12, 1933 |
| 1,919,752 | Great Britain | July 25, 1933 |
| 2,139,000 | Great Britain | Dec. 6, 1938 |

OTHER REFERENCES

Elements of Fractional Distillation by Robinson, first edition, McGraw-Hill Book Company, 370 7th Ave., New York, N. Y., pages 147 and 151.